United States Patent [19]

Kobayashi et al.

[11] Patent Number: 4,693,353

[45] Date of Patent: Sep. 15, 1987

[54] SUPPORT FOR TRANSMISSION SHAFT AND HYDRAULIC SERVO DRUM

[75] Inventors: Koji Kobayashi, Toyota; Koji Sumiya, Nishio; Yutaka Taga, Aichi; Kazuaki Watanabe, Toyota, all of Japan

[73] Assignees: Aisin-Warner Limited, Anjo; Toyota Jidosha Kabushiki Kaisha, Toyota, both of Japan

[21] Appl. No.: 763,007

[22] Filed: Aug. 6, 1985

[30] Foreign Application Priority Data

Aug. 7, 1984 [JP] Japan .................................. 59-166156

[51] Int. Cl.$^4$ ...................... F16D 25/061; F16D 13/58
[52] U.S. Cl. .............................. 192/85 AA; 192/85 R; 192/115
[58] Field of Search ................. 192/85 AA, 85 R, 115, 192/87.11, 87.13, 87.14, 87.15

[56] References Cited

U.S. PATENT DOCUMENTS

| | | | |
|---|---|---|---|
| 2,583,556 | 1/1952 | Fleischel | 192/85 AA X |
| 3,236,349 | 2/1966 | Wiggins et al. | 192/85 AA X |
| 3,285,379 | 11/1966 | Helquist | 192/85 AA |
| 3,353,641 | 11/1967 | Chana | 192/85 AA |
| 3,421,608 | 1/1969 | Van Gorder | 192/85 AA |
| 3,554,057 | 1/1971 | Michnay et al. | 192/87.11 X |
| 3,596,537 | 8/1971 | Koivunen | 192/85 AA X |
| 3,642,107 | 2/1972 | Borman et al. | 192/85 AA X |
| 3,650,364 | 3/1972 | Laing | 192/85 AA |
| 3,848,518 | 11/1974 | Martin | 192/85 AA X |
| 4,421,218 | 12/1983 | Haight | 192/85 AA X |

Primary Examiner—Leslie Braun
Assistant Examiner—Richard M. Lorence
Attorney, Agent, or Firm—Spencer & Frank

[57] ABSTRACT

A support for an automatic transmission. The support has a tubular supporting portion having an inner peripheral surface supporting a transmission shaft and an outer peripheral surface supporting an inner cylindrical portion of a hydraulic servo drum of the transmission. The support has working oil passages formed therein and adapted for supplying and discharging a working oil to and from the hydraulic servo drum. The support has a support body including a first oil passage leading from an oil pressure controller for supplying and discharging working oil and communicating with the inner periphery of the tubular supporting portion, a second oil passage providing a communication between the outer periphery and the inner periphery of the tubular supporting portion and an inner oil groove providing a communication between inner peripheral openings of the first and second oil passages. The support further has an inner sleeve fitting on the inner peripheral surface of the tubular supporting portion to cover the oil groove thereby forming an oil passage for working oil, and an outer sleeve fitting on the outer periphery of the tubular supporting portion, the outer sleeve being provided with a sleeve hole aligned with a working oil port formed in the inner cylindrical portion of the hydraulic servo drum and communicating with an outer peripheral opening of the second oil passage. The outer sleeve is further provided in the outer peripheral surface thereof with ring grooves formed at both sides of the sleeve hole and adapted to receive seal rings.

2 Claims, 7 Drawing Figures

FIG. I

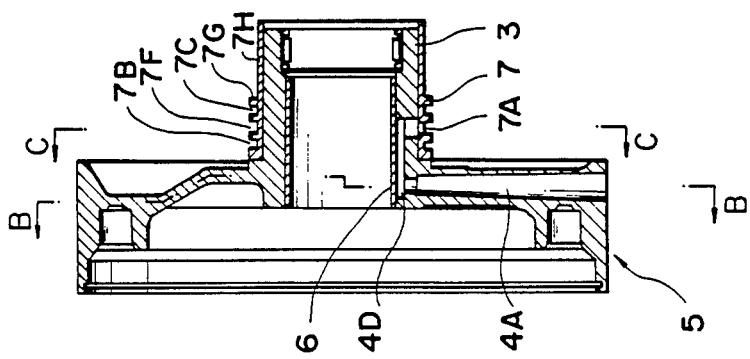
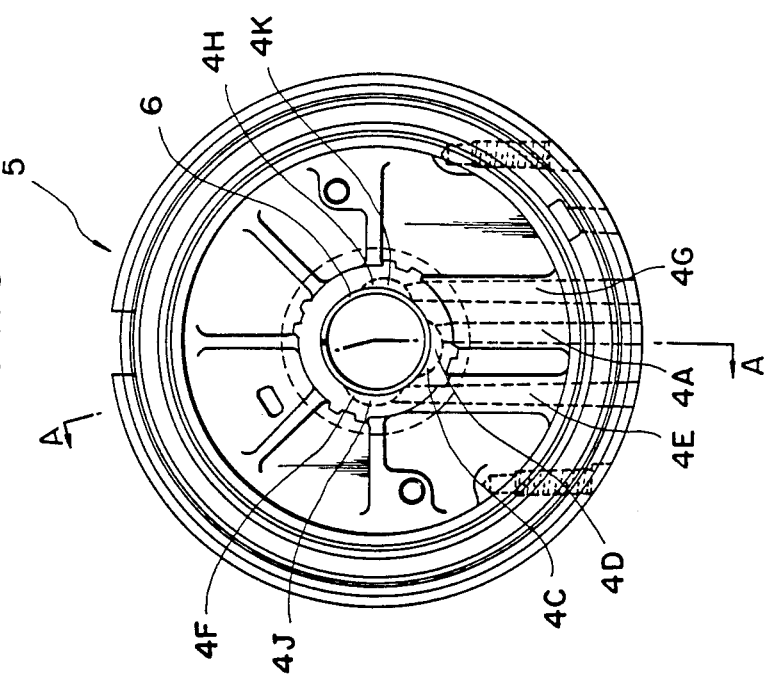

SUPPORT FOR TRANSMISSION SHAFT AND HYDRAULIC SERVO DRUM

BACKGROUND OF THE INVENTION

1. Field of the Invention

The present invention broadly relates to an automatic transmission apparatus and, more particularly, to a support which is designed for supporting both the power transmission shaft and a hydraulic servo drum in the transmission apparatus and having internal oil passages for supply and discharge of the oil to and from the hydraulic servo drum.

2. Description of the Prior Art

A typical known automatic transmission apparatus has a power transmission shaft for transmitting the power, an annular hydraulic servo drum receiving a piston for driving a friction engagement means into and out of friction engagement, and a support having a tubular supporting portion which supports the transmission shaft at its inner peripheral surface while supporting at its outer peripheral surface the inner peripery of the hydraulic servo drum, the support being provided therein with oil passages through which oil is supplied to and discharged from the hydraulic servo drum. The hydraulic servo drum, transmission shaft and the support are made of aluminum in order to reduce the weight. The support has the oil supply and discharge passages formed in the outer peripheral surface thereof and designed for the supply and discharge of oil to and from the inner periphery of the hydraulic servo drum. The support also has an internal oil passage formed in the wall of the tubular supporting portion thereof. This internal oil passage has a radial oil passage formed from the outer peripheral surface of the tubular supporting portion so as not to reach the inner peripheral surface of the same, an axial oil passage formed from one axial end surface of the tubular supporting portion and communicating with the radial passage, the opening of the axial passage in the axial end of the tubular supporting portion being then plugged, and oil passages extending from the outer peripheral surface to the inner peripheral surface of the tubular supporting portion and aligned with the oil supplying and discharging holes formed in the inner periphery of the hydraulic servo drum. The tubular supporting portion has ring grooves for receiving seal rings which are adapted for preventing oil from leaking outside during the supply and discharge of the oil to and from the oil passage holes in the hydraulic servo drum from and to the opening of the passage holes opening in the outer peripheral surface of the tubular supporting portion.

SUMMARY OF THE INVENTION

As explained before, in the prior art transmission apparatus, the support has the oil supply and discharge passages formed in the outer peripheral surface thereof and designed for the supply and discharge of oil to and from the inner periphery of the hydraulic servo drum. The support also has an internal oil passage formed in the wall of the tubular supporting portion thereof. This internal oil passage has a radial oil passage formed from the outer peripheral surface of the tubular supporting portion so as not to reach the inner peripheral surface of the same, an axial oil passage formed from one axial end surface of the tubular supporting portion and communicating with the radial passage, the opening of the axial passage in the axial end of the tubular supporting portion being then plugged, and oil passages extending from the outer peripheral surface to the inner peripheral surface of the tubular supporting portion and aligned with the oil supplying and discharging holes formed in the inner periphery of the hydraulic servo drum. The tubular supporting portion has ring grooves for receiving seal rings which are adapted for preventing oil from leaking outside during the supply and discharge of the oil to and from the oil passage holes in the hydraulic servo drum from the opening of the passage holes opening in the outer peripheral surface of the tubular supporting portion.

It is quite difficult to form holes and passages so that the productivity of the support is extremely low. In addition, it is rather difficult to form the ring grooves for seal rings in the outer peripheral surface of the tubular supporting portion, because the outer peripheral surface of the tubular supporting portion is provided in the inner periphery of the hydraulic servo drum.

In recent years, seal rings made of resins having lightweight and good oil-sealing nature, such as TEFLON, have been proposed. The seal rings made of resins, however, do not exhibit good affinity to aluminum so that they are not suited to use in combination with the support when the latter is made of aluminum.

Accordingly, an object of the invention is to provide a support for use in an automatic transmission of the type having a transmission shaft for transmitting power, an annular hydraulic servo drum in which is fitted a piston for engaging and disengaging a friction engaging means, and the support having a tubular supporting portion having an inner peripheral surface supporting the transmission shaft and an outer peripheral surface supporting an inner cylindrical portion of the hydraulic servo drum, the support having working oil passages formed therein and adapted for supplying and discharging a working oil to and from the hydraulic servo drum, the support comprising: a first oil passage leading from an oil pressure controller for supplying and discharging the working oil and communicating with the inner periphery of the tubular suporting portion; a second oil passage providing a communication between the outer periphery and the inner periphery of the tubular supporting portion and corresponding to a working oil port formed in the inner cylindrical portion of the hydraulic servo drum; and an oil groove providing a communication between the inner peripheral openings of the first and second oil passages; an inner sleeve fitting on the inner peripheral surface of the tubular supporting portion so as to cover the oil groove thereby forming an oil passage for the working oil; and an outer sleeve fitting on the outer periphery of the tubular supporting portion, the outer sleeve being provided with a sleeve hole aligned with the working oil port formed in the inner cylindrical portion of the hydraulic servo drum through the outer peripheral opening of the second oil passage, the outer sleeve being further provided in the outer peripheral surface thereof with ring grooves formed at both sides of the sleeve hole and adapted to receive seal rings.

According to this arrangement, it is possible to form the oil passages in the support more easily than in the conventional support.

It is to be noted also that the machining for the formation of the ring grooves is facilitated because the grooves are formed in the outer sleeve which is formed separately from the tubular supporting portion and adapted to be fitted on the outer periphery of the same. This construction also permits the selection of materials of the inner and outer sleeves in accordance with the uses and conditions such as the material of the seal rings.

For instance, by constructing the outer sleeve of iron, stainless steel or like material, it becomes possible to use resin seal rings which are light in weight and which are superior in oil sealing effect.

Similarly, where seal rings are disposed between the tubular supporting portion and the power transmission shaft, such seal rings may be made of resins provided that the inner sleeve is made of an iron, stainless steel or like material.

<BRIEF DESCRIPTION OF THE DRAWINGS>

FIG. 3 is a front elevational view of the support;

FIG. 4 is a sectional view taken along the line A—A of FIG. 3;

DESCRIPTION OF THE PREFERRED EMBODIMENT

A preferred embodiment of the support of the invention for supporting a transmission shaft and a hydraulic servo drum will be explained hereinunder.

Figure 1:
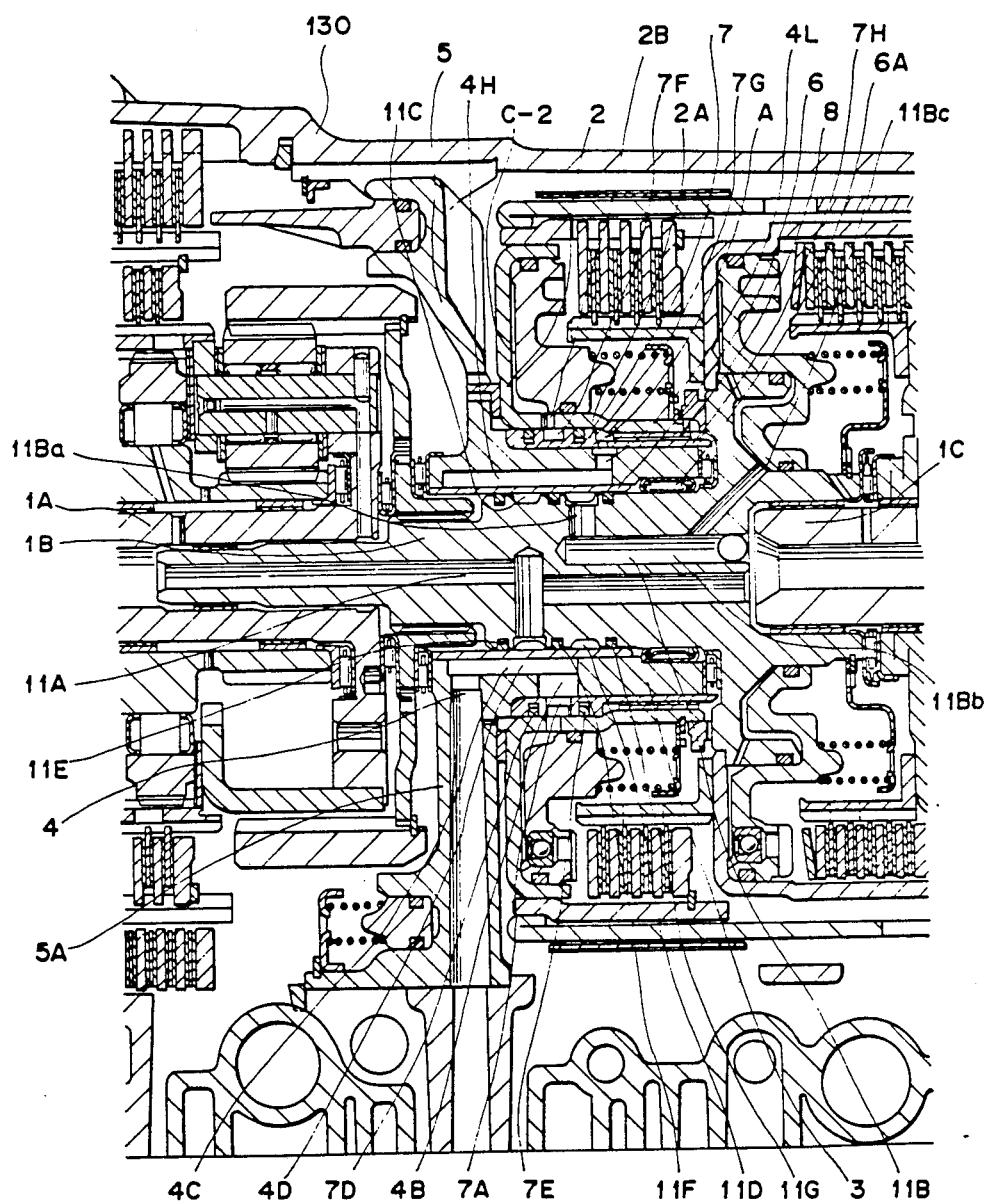
FIG. 1 is a sectional side elevational view of a support for supporting a transmission shaft and a hydraulic servo drum, constructed in accordance with the invention.
Figure 2:
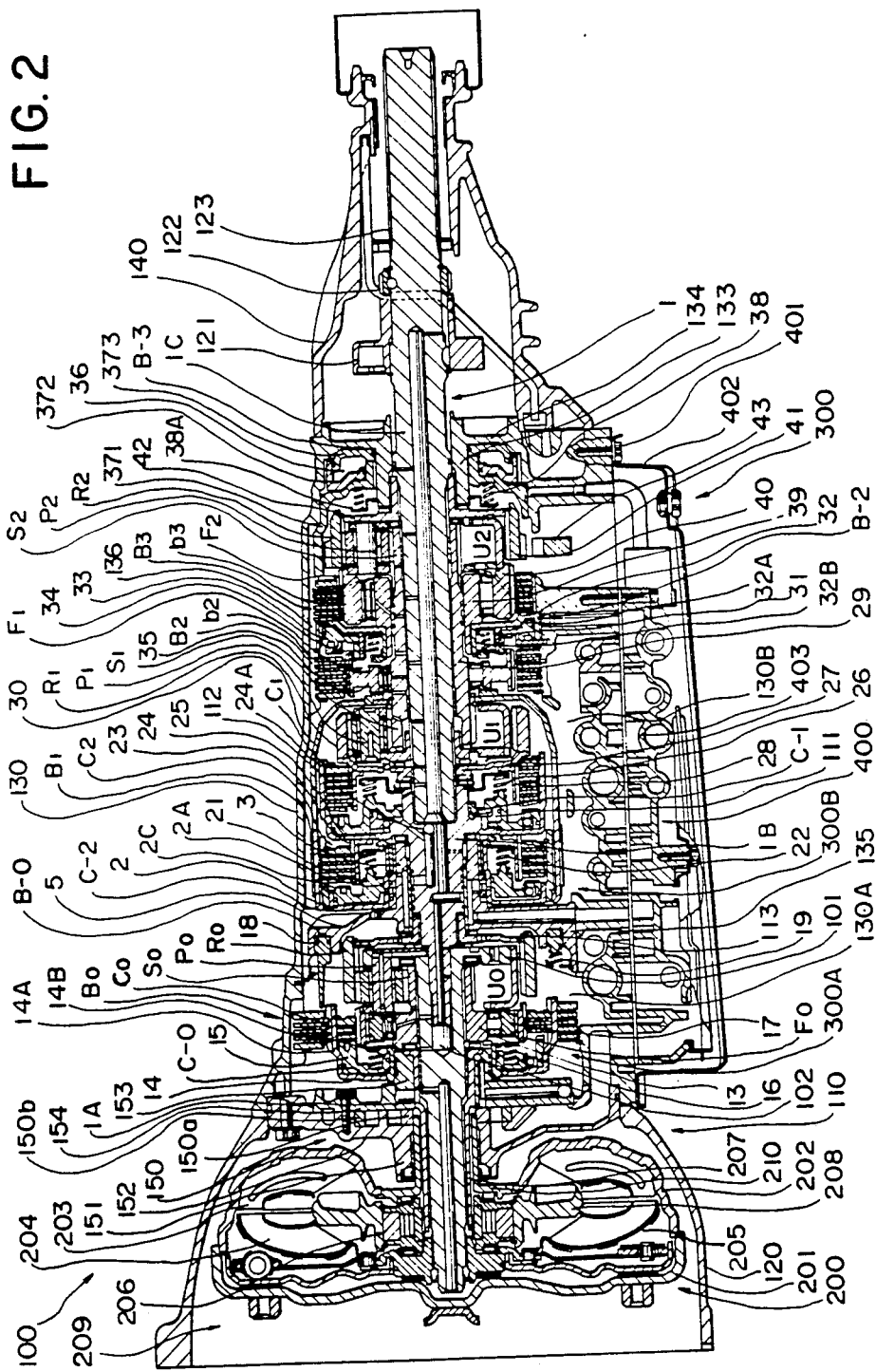
FIG. 2 is a sectional side elevational view of an automotive automatic transmission apparatus incorporating the support in accordance with the invention.
Figure 5:
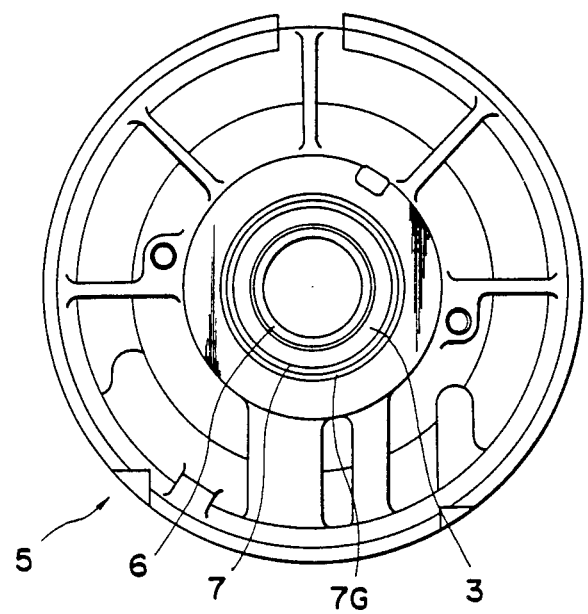
FIG. 5 is a rear elevational view of the support.
Figure 6:
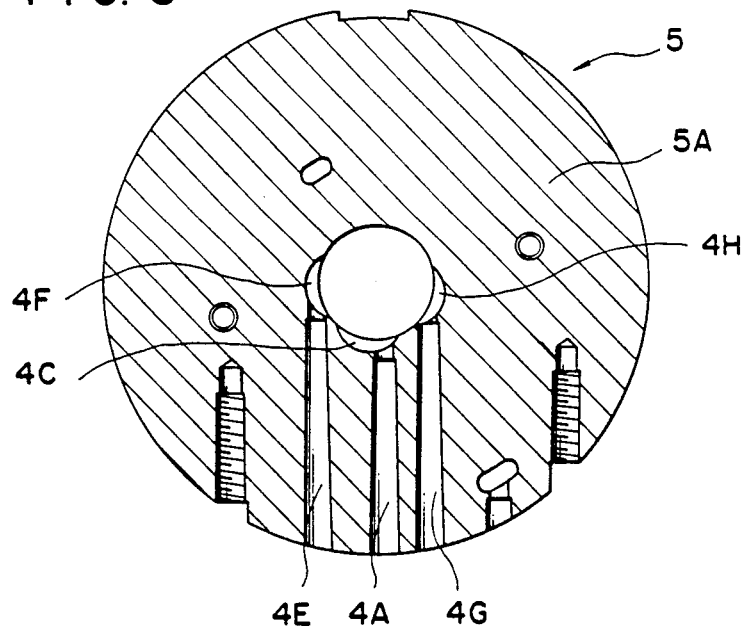
FIG. 6 is a sectional view taken along the line B—B of FIG. 4.
Figure 7:
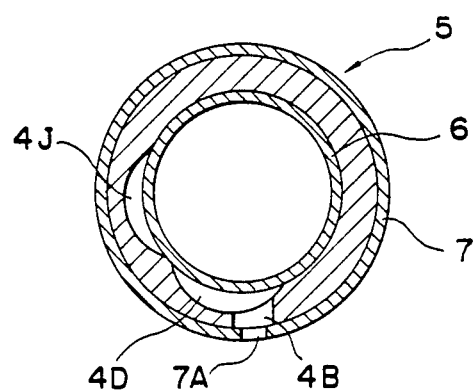
FIG. 7 is a sectional view taken along the line C—C of FIG. 4.

Referring to FIGS. 1 and 2, an automatic transmission apparatus 100 is composed of a fluid-type torque converter 200, a transmission 300 and a hydraulic controller 400.

The transmission 300 is composed of two major parts: namely, an overdrive speed changing gear 300A composed of first planetary gear device Uo, a multi-disc clutch Co driven by a hydraulic servo motor, a multi-disc brake Bo and a one-way clutch Fo; and an underdrive speed changing gear 300B composed of a second planet gear device U1, third planet gear device U2, two multi-disc clutches C1, C2 driven by hydraulic servomotors, a belt brake B1, two multi-disc brakes B2, B3 and two one-way clutches F1, F2, the underdrive speed changing gear having three forward ranges and one backward range.

The automatic transmission apparatus 100 has a transmission casing 110 which is constituted by a torque converter housing 120 for accommodating a torque converter 200, an integral transmission case 130 defining chambers for overdrive speed changing gear 300A and the underdrive speed changing gear, respectively, and an extension housing 140 which closes the rear side of the automatic transmission 100. The torque converter housing 120, transmission case 130 and the extension housing 140 are connected to each other by a multiplicity of bolts. The transmission casing 110 accommodates a transmission shaft 1 which is constituted by an input shaft 1A which transmits power from the torque converter 200 to the overdrive speed changing gear 300A, an intermediate transmission shaft 1B for transmitting the power from the overdrive speed changing gear 300A to the underdrive speed changing gear 300B, and an output shaft 1C through which the power of the underdrive speed changing gear 300B is outputted.

The torque converter 200 is received in a torque converter housing 120 which is opened at the front side thereof adjacent the engine. The torque converter 200 is constituted by various parts including a front cover 201 which is driven by the engine (not shown), a rear cover 202 having an annular disc-like form and welded to the inner periphery of the front cover 202, a pump impeller 203 provided on the inner peripheral wall of the rear cover 202, a turbine runner 204 opposing the pump impeller 203, a turbine shell 205 holding the turbine runner 204, a stator 208 supported by a fixed shaft 207 connected through the one-way clutch 206 to the transmission case 110 and adapted to increase the torque capacity when the input rotation speed is low, and a direct-connection clutch (lock-up clutch) 209 disposed between the front cover 201 and the turbine shell 205 and adapted to lock up these members for rotation at an equal speed. An internal-contact type gear oil pump 150, which is composed of an externally toothed gear 150a and an internally toothed gear 150b, is disposed between the tubular cylindrical transmission case 130 and the rear side of the torque converter housig 120. An oil pump body 152 having a forwardly extending cylindrical portion 151 at the inner periphery thereof is connected to a front portion of the transmission case 130. An extension member 210 connected to the end of the inner periphery of the rear cover 202 is splined to the inner periphery of the externally-toothed gear 150a through the inner periphery of the cylindrical portion 151. To the rear side of the oil pump body 152, is attached an oil pump cover 154 extending rearwardly therefrom coaxially with the cylindrical portion 151. The oil pump housing 152 and the oil pump cover 154 constitute the partition wall between the torque converter housing 120 and the transmission case 130. At an intermediate portion of the transmission case 130, there is disposed a center support 5 having a rearwardly projecting tubular supporting portion 3. The tubular supporting portion 3 separates an overdrive mechanism chamber 130A housing the overdirve speed changing gear 300A and an underdrive mechanism chamber 130B housing the underdrive speed changing gear 300B from each other, and supports on the inner peripheral surface thereof the intermediate transmission shaft 1B of the transmission shaft 1. On the rear portion (right portion as viewed in FIG. 2), is provided a rear support wall 134 which projects forwardly therefrom and having a rear support 133 which supports on the inner periphery thereof the output shaft 1C. A stationary shaft 207 of the one-way clutch 206 supporting the stator 208 of the torque converter 200 fits in the front support 153. The input shaft 1A of the transmission 300 constituting the output shaft of the torque converter 200 is rotatably supported in the stationary shaft 207. The input shaft 1A is provided on the rear end thereof with a flange portion 101. A rearwardly opened hole 102 is formed in the center of the rear end of the input shaft 1A. The intermediate transmission shaft 1B is rotatably mounted on the rear side of the input shaft 1A in series thereto. More specifically, the intermediate transmission shaft 1B has a front end slidably received in the hole 102 of the input shaft 1A. The intermediate shaft 1B is provided with an internal oil supply passage 11A (FIG. 1) which supplies a lubricating oil from the outer periphery of the intermediate shaft 1B into the input shaft 1A and the output shaft 1C, as well as a servo oil passage 11B which is constituted by an internal oil supply passage 11Ba providing a communication between the outer periphery of the intermediate shaft 1B and the later-mentioned hydraulic servo C-1, internal oil flow passage 11Bb and a tapered oil passage 11Bc. The intermediate transmission shaft 1B is provided on the rear end thereof with a flange portion 111 in the center of which is formed a rearwardly opened hole 112 which slidably receives the end of the output shaft 1C for transmitting the power to the wheels of an automobile. Oil grooves 11C and 11D are formed in the portions of the outer peripheral surface where the internal oil supply passage 11A and the servo oil passage 11B open. Seal rings 11E, 11F and 11G are arranged adjacent the oil grooves 11C and 11D to prevent the working oil and the lubricating oil from leaking outside. A sensor rotor 121 for sensing revolution speed and a speed meter drive gear 122 are fixed to the portion of the output shaft 1C in the extension housing 140. The output shaft 1C is provided at its rear end with a spline groove 123 to which is splined a sleeve yoke for transmitting power to the wheels of the automobile. The rear end portion of the output shaft 1C is rotatably supported by the extension housing 140 through the sleeve yoke, while the front end portion of the same is rotatably supported in the hole 112 of the intermediate transmission shaft 1B.

As stated before, the overdrive speed changing gear 300A has a first planet gear device Uo disposed behind the input shaft 1A. The first planet gear device Uo has a ring gear Ro coupled to the intermediate shaft 1B through a flange plate 113. The planetary gear device Uo also has a planetary carrier Po coupled to the flange portion 101 of the input shaft 1A and a sun gear So constituted by the inner race shaft 13 of the one-way clutch Fo. At the front side of the first planetary gear device Uo, a first hydraulic servo drum 14 having a rearwardly opening hole is fixed to the inner race shaft 13. An annular piston 15 fits in a space between the outer peripheral wall 14A and the inner peripheral wall 14B of the first hydraulic servo drum 14 to constitute a hydraulic servo C-0 for the clutch C0 which is adapted to operate to bring the first hydraulic servo drum 14 into and out of engagement with the carrier P0. A return spring 16 mounted on the inner race shaft 13 is adapted to urge the annular piston 15 towards the hydraulic servo C-0, while the clutch C0 is mounted inside the outer peripheral wall 14A. The first hydraulic servo drum 14 and the inner race shaft 13 are connected to the carrier P0 through the first clutch C0. A one-way clutch F0 having an inner race constituted by the inner race shaft 13 is disposed inside the first hydraulic servo drum 14. The clutch C0 and a brake B0 are disposed between an outer race 17 of the one-way clutch F0 and the transmission case 130. A piston 18 for urging the brake B0 fits on the front side of the center support 5 behind the brake B0, such that a hydraulic servo B-0 is formed between the piston 18 and the center support 5. A return spring 19 for urging the piston 18 towards the hydraulic servo B-0 fits in the inner periphery of the front end of the center support 5.

The underdrive speed changing gear 300B is provided at its front portion with a second servo drum 2 having a rearward opening and rotatably supported on the outer periphery of the tubular supporting portion 3 of the center support 5 through seal rings 7D, 7E and the tubular bush 8. An annular piston 21 for urging the clutch C2 fits in the space between an outer cylindrical portion 2C and the inner cylindrical portion 2A of the second hydraulic servo drum 2. The annular piston 21 and the hydraulic servo drum 2 defines therebetween a hydraulic servo C-2 for the clutch C2, while a return spring 22 for urging the annular piston 21 towards the hydraulic servo C-2 is provided on the inner cylindrical portion 2A. At the same time, a clutch C2 is mounted inside the outer cylindrical portion 2C. Working oil charging and discharging holes 2B communicating with the hydraulic servo C-2 is provided in the inner cylindrical portion 2A. At the rear side of the second hydraulic servo drum 2, a third hydraulic servo drum 24 is fixed to the outer periphery of the flange portion 111 on the rear end portion of the intermediate transmission shaft 1B. The third hydraulic servo drum 24 has a rearward opening and is provided at its front portion with an annular projection 23. An annular piston 25 for urging the clutch C1 fits in a space which is defined by the rear end of the intermediate transmission shaft 1B, outer peripheral wall 24A of the third hydraulic servo drum 24 and the flange portion 111, such that the hydraulic servo C-1 is formed between the annular piston 25 and the third servo drum 24. A return spring 26 for urging the annular piston 25 towards the hydraulic servo C-1 is provided on the inner periphery of the clutch C1, while the second clutch C2 fits on the outer periphery of the annular projection 23, such that the second and the third servo drums 2 and 24 are connected to each other through the clutch C2. The second planet gear device U1 is disposed on the rear side of the third servo drum 24. The ring gear R1 of the second planet gear device U1 is rotatably supported on the outer periphery of the output shaft 1C by a rotary supporting member 27, and is connected to the third servo drum 24 through an annular projection 28 on the front end of the rotary supporting member 27 and through the clutch C1. The carrier P1 is splined to the outer periphery of the front end of the output shaft 1C. The sun gear S1 is formed integrally on the end of the sun gear shaft 29 which is rotatably carried by the outer periphery of the output shaft 1C. A connecting drum 30 constructed so as to cover the second and third servo drums 2, 24 and the second planet gear device U1 in minimal space is fixed at its front end to the outer periphery of the second servo drum 2, while the rear end of the same is connected to the sun gear shaft 29 at the rear side of the second planet gear device U1. The belt brake B1 for braking and releasing the connecting drum 30 is provided on the outer periphery of the drum 30.

As will be seen from FIGS. 3 to 7, the center support 5 is composed of the following parts: namely, a support main body 5A made of a light material such as aluminum and supported at its outer periphery by the transmission case 130; an inner sleeve 6 made of iron to attain a good affinity to the Teflon seal rings 11C and 11E on the outer peripheral surface of the intermediate transmission shaft 1B; and an outer sleeve made of iron. The support main body 5A has the following oil passages: a first oil passage 4A extending from the outer periphery to the inner periphery and adapted for supplying and discharging the oil to and from the hydraulic servo C-2, a second oil passage 4B corresponding to the working oil port 2B formed in the inner cylindrical portion 2A of the second hydraulic servo drum 2; an oil groove 4C which provides a communication between the opening of the first oil passage 4A on the inner peripheral surface and the opening of the second oil passage 4B in the same inner peripheral surface; an oil passage 4E extended from the outer periphery to the inner periphery and adapted for supplying and discharging the oil to and from the hydraulic servo C-1, an oil groove 4F which extends axially to provide a communication between the inner peripheral opening of the oil passage 4E and the outer peripheral opening of the servo oil passage 11B which is formed in the intermediate transmission shaft 1B and communicating with the hydraulic servo C-1, a lubricating oil passage 4G for supplying the lubricating oil from the outer periphery to the inner periphery, and a lubricating oil groove 4H which extends axially to provide a communication between the inner peripheral opening of the lubricating oil passage 4G and the outer peripheral opening of the oil supply passage 11A formed in the intermediate transmission shaft 1B.

The inner sleeve 6 fits on the inner peripheral surface of the tubular supporting portion 3 of the support main body 5A, to cover the C2 oil groove 4C, C1 oil groove 4F and the lubricant oil groove 4H and has an oil passage 4D, oil passage 4J and a lubricating oil groove 4H corresponding to the oil passages and groove 4C, 4F and 4H, respectively.

The outer sleeve 7 fits on the outer peripheral surface of the tubular supporting portion 3 of the support main body 5A, and is provided with a sleeve hole 7A provided at a position corresponding to the working oil port 2B formed in the inner cylindrical portion 2A of the second servo drum 2 and communicating with the outer peripheral opening of the internal oil passage 4B, an oil groove 7F formed in the portion of the outer peripheral surface corresponding to the sleeve hole 7A, and ring grooves 7B and 7C formed in the portions of the outer peripheral surface at both sides of the oil groove 7F and adapted to receive seal rings 7D, 7E. The outer sleeve 7 is stepped at a rear portion thereof to form a journal portion 7H of a reduced thickness and covered by an outer peripheral bush 8. A gap A is formed at the rear side of the step 7G, between the outer periphery of the outer peripheral sleeve 7 and the inner periphery of the inner cylindrical portion 2A. The gap A is communicated with the lubricating oil groove 4H through a lubricating oil supply passage 4L to be supplied with the lubricating oil therethrough. A roller bearing 6A for ensuring smooth rotation of the intermediate transmission shaft 1B is disposed in the portion of the space between the intermediate transmission shaft 1B and the tubular supporting portion 3 at the rear side of the inner sleeve 6.

In operation, for bringing the clutch C2 into engaging state, the oil pressure controller 400 operates to supply the working oil to the oil passage. This oil is then supplied into the hydraulic servo C-2 through the oil passage 4D, oil passage 4B, sleeve hole 7A, oil groove 7F and the oil port 2B in the inner cylindrical portion 2A. The working oil supplied to the oil passage 4E is supplied to and discharged from the hydraulic servo C-1, through an oil port (not shown) in the inner peripheral sleeve 6, oil groove 11D and the servo oil passage 11B. The lubricating oil supplied to the lubricating oil passage 4G is delivered to the supply passage 11A through an oil port (not shown) formed in the sleeve 6 and the oil groove 11C. The lubricating oil supplied into the oil passage 11A is delivered to the input shaft 1A and the output shaft 1C.

A brake plate b2 of the brake B2 and a brake plate b3 of the brake B3 are splined, respectively, to the front and rear portions of the spline teeth formed in the rear inner peripheral portion of the transmission case 130. A fourth hydraulic servo drum 32 which is opened forwardly and provided at its front portion with an annular projection 31 is splined to an intermediate portion of the spline in the transmission case 130 between the brakes B2 and B3. An annular piston 33 for urging the brake B2 fits in a space between an outer peripheral wall 32A of the fourth servo drum 32 and the circular projection 31. A hydraulic servo B-2 for the brake B2 is disposed between the annular piston 33 and the fourth hydraulic servo drum 32. A return spring 34 for urging the annular piston 33 towards the hydraulic servo B-2 is provided on the inner peripheral wall 32B. The one-way clutch F1 provided on the inner periphery of the brake B2 has an inner race constituted by the sun gear shaft 29, while the brake B2 is provided on the outer periphery of the outer race 35. A plurality of pistons 371, 373 for urging the brake B3 and a reaction sleeve 372 fit in an annular space 36 formed between the transmission case 130 and the outer periphery of the rear support 133 of the rear support wall 134 of the brake B2 to constitute a hydraulic servo B-3 for the brake B3. At the same time, a return spring 38 for urging the pistons 371, 373 towards the hydraulic servo B-3 is retained by a return spring retainer 38A attached to an end of the rear support 133. The inner race 39 of the one-way clutch F2 provided on the inner periphery of the brake B3 is connected at the outer periphery of the sun gear shaft 29 to the fourth hydraulic servo drum 32, while the brake B3 is mounted on the outer periphery of the outer race 40 of the one-way clutch F2. The third planet gear device U2 has the sun gear S2 formed as a unit with a sun gear shaft 29. The carrier P2 is connected both to the outer race 40 of the one-way clutch F2 and the brake B3. The ring gear R2 which is provided on the outer periphery thereof with a parking gear 41 is connected to the output shaft 1C through a connecting member 42 provided with an internally splined connecting member 42. The parking gear 41 is arranged such as to be engaged by a parking claw 43 of a shift lever of the automatic transmission when the lever selects the parking position, thereby fixing the output shaft 1C.

In the transmission 300, the clutches and brakes are selectively operated on and off in accordance with the oil pressures which are selectively outputted depending on the conditions such as the running speed, throttle opening and so forth to respective servos from the oil pressure controller 400 in the valve body 403 which is accommodated by an oil pan 402 fastened to the lower side of the transmission case 130 by means of bolts 401. As a result of the selective operation of the clutches and brakes, the transmission 300 conducts a speed changing operation over four forward ranges and one backward range. An example of the relationship between the states of the clutches and brakes and the obtained speed range is shown in Table 1.

TABLE 1

| RANGE | | CLUTCH | | | BRAKE | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |
|   | 2 | E | E | X | X | X | E | X | (L) | L | f |
|   | 3 | E | E | E | X | X | E | X | (L) | f | f |
|   | 4 | X | E | E | E | X | E | X | f | f | f |
| S | 1 | E | E | X | X | X | X | X | (L) | f | L |
|   | 2 | E | E | X | X | E | E | X | (L) | (L) | f |
|   | 3 | E | E | E | X | X | X | X | (L) | f | f |
| L | 1 | E | E. | X | X | X | X | E | (L) | f | (L) |
|   | 2 | E | E | X | X | E | E | X | (L) | (L) | f |

In Table 1, a symbol E respresents that the clutch or the brake is in the engaging or on state, while a mark x shows that the clutch or the brake is in the disengaged or off state. A symbol (L) represents that the one-way clutch is in the engaged state in the engine driving condition but the engagement is not always necessary because the power transmission is ensured by a clutch or brake parallel therewith, i.e., the locked state of the transmission. A sysmbol L shows that the one-way clutch is in the engaging state only in the engine driving condition but is not held in the engaging state during engine braking. A symbol f represents that the one-way clutch is in the free stated.

Although the invention has been described through specific terms, it is to be noted that the described embodiment is not exclusive and various changes and modifications may be imparted thereto without departing from the scope of the invention which is limited solely by the appended claims.

What is claimed is:

1. In a support for use in an automatic transmission apparatus of the type having a transmission shaft for transmitting power, an annular hydraulic servo drum and a piston fitted in the hydraulic servo drum for engaging and disengaging a friction engaging means, wherein the support has an axially extending tubular supporting portion having an inner peripheral surface for supporting the transmission shaft, an outer peripheral surface for supporting an inner cylindrical portion of the hydraulic servo drum, and working oil passages formed therein and adapted for supplying and discharging a working oil to and from the hydraulic servo drum, the improvement wherein:

said support comprises:

a support body made of light material having a first radially extending oil passage leading from an oil pressure controller for supplying and discharging a working oil and communicating with the inner peripheral surface of said tubular supporting portion, a second radially extending oil passage providing a communication between the outer peripheral surface and the inner peripheral surface of said tubular supporting portion and an inner axially extending oil groove providing a communication between inner peripheral openings of said first and second oil passages;

an inner sleeve of a heavier material than said support body fitting on the inner peripheral surface of said tubular supporting portion to cover said inner axially extending oil groove thereby forming an oil passage for working oil; and an outer sleeve of a heavier material than said support body fitting on the outer peripheral surface of said tubular supporting portion, said outer sleeve having an outer peripheral surface, a radially extending sleeve hole in said outer sleeve, said slave hole being aligned with a working oil port formed in the inner cylindrical portion of the hydraulic servo drum and communicating with an outer peripheral opening of said second oil passage, an outer oil groove being formed in the outer peripheral surface said outer sleeve to connect said second oil passage to the working oil port through said sleeve hole, and ring grooves formed in the outer peripheral surface of said outer sleeve at both sides of said outer oil groove and seal rings made of resin being received in each of said ring grooves.

2. A support as defined in claim 1, wherein said outer sleeve has a journal portion rotatably fitted with a bush, said journal portion and said bush being fitted in the inner cylindrical portion of the hydraulic servo drum.

* * * * *